United States Patent
Everson et al.

(10) Patent No.: US 12,113,779 B2
(45) Date of Patent: Oct. 8, 2024

(54) CRYPTOGRAPHIC MICRO-SEGMENTATION USING IKEV2

(71) Applicant: Certes Networks, Inc., Pittsburgh, PA (US)

(72) Inventors: Sean D. Everson, Valencia, PA (US); Ganesh Murugesan, Bangalore (IN)

(73) Assignee: Certes Networks, Inc., Pittsburgh, PA (US)

( * ) Notice: Subject to any disclaimer, the term of this patent is extended or adjusted under 35 U.S.C. 154(b) by 311 days.

(21) Appl. No.: 17/657,211

(22) Filed: Mar. 30, 2022

(65) Prior Publication Data

US 2022/0321545 A1    Oct. 6, 2022

Related U.S. Application Data

(60) Provisional application No. 63/168,072, filed on Mar. 30, 2021.

(51) Int. Cl.
*H04L 9/40* (2022.01)
*H04L 67/146* (2022.01)

(52) U.S. Cl.
CPC ...... *H04L 63/0435* (2013.01); *H04L 63/0263* (2013.01); *H04L 63/20* (2013.01); *H04L 67/146* (2013.01)

(58) Field of Classification Search
CPC . H04L 63/0263; H04L 63/0435; H04L 63/20; H04L 67/146
See application file for complete search history.

(56) References Cited

U.S. PATENT DOCUMENTS

| | | | | |
|---|---|---|---|---|
| 8,713,669 | B2 * | 4/2014 | Guichard | H04L 63/065 |
| | | | | 380/278 |
| 9,300,570 | B2 * | 3/2016 | Hengeveld | H04L 12/4633 |
| 9,596,215 | B1 * | 3/2017 | Goel | H04L 63/06 |
| 10,616,001 | B2 * | 4/2020 | Mayer-Wolf | H04L 45/00 |
| 11,218,873 | B2 * | 1/2022 | Bala | H04L 63/0428 |
| 11,943,094 | B2 * | 3/2024 | Ramachandran | H04L 41/0668 |
| 2019/0089747 | A1 * | 3/2019 | Wang | H04L 63/1441 |
| 2022/0360566 | A1 * | 11/2022 | Sawant | H04L 63/061 |

* cited by examiner

*Primary Examiner* — Linglan Edwards
(74) *Attorney, Agent, or Firm* — Hamilton, Brook, Smith & Reynolds, P.C.

(57) ABSTRACT

A method of establishing one or more secure channels between network devices comprises exchanging a base key pair between a first network device and a second network device, and for each of a plurality of policies, providing a nonce corresponding to that policy to the first and second devices. The method further comprises generating, for each of the plurality of policies, a session key that is a function of the base key pair and the policy nonce. The method comprises determining, at the first device, that a data packet matches a rule associated with a policy, encrypting the data with a session key that corresponds to the policy to produce an encrypted packet, and conveying the encrypted packet to the second device. At the second device, determining that the encrypted packet matches the rule associated with the policy, and decrypting the encrypted packet with the session key.

20 Claims, 6 Drawing Sheets

KDF
Policy P => $K1_P$ $K2_P$ => $S1_P$ $S2_P$

CRYPTOGRAPHIC MICRO-SEGMENTATION USING IKEV2

RELATED APPLICATION

This application claims the benefit of U.S. Provisional Application No. 63/168,072, filed on Mar. 30, 2021. The entire teachings of the above application(s) are incorporated herein by reference.

BACKGROUND

Two entities (e.g., communication devices) on a network may, at times, require a secure channel to communicate with one another, while excluding other entities on the network. A virtual private network (VPN) protocol may be used to establish such a secure channel. An example of such a VPN protocol is the Internet Key Exchange, version 2 (IKEv2).

The IKEv2 protocol facilitates exchanging cryptographic keys between a pair of network devices. Once the keys are exchanged, the network devices use the keys to encrypt and decrypt network packets between that pair of devices. Each device will independently (e.g., via configuration) add what applications and users associated with the device should use the keys for encryption/decryption.

IKEv2 supports exchanging exactly one pair of keys between the two network devices. Once exchanged, the devices will use the single pair of keys to encrypt/decrypt all data packets that are authorized to use the key pair. This does not provide the desired granularity of a key per user/application access and instead supports a shared key. When this key pair is compromised, the security of all applications being accessed may be compromised.

SUMMARY

The described embodiments support segmentation of data traffic via Cryptographic operation while using IKEv2 to exchange key pairs between a pair of network entities (communication devices). This approach allows each access to an application within the network entity to be associated with a unique cryptographic key, rather than being associated with a single shared key between the pair of network entities.

In contrast with the IKEv2 model alone, which uses one cryptographic key pair to encrypt all data passing between the two network devices, the described embodiments generate security keys per policy, which provides more granular security for accessing critical applications. This ensures that even if the security key associated with one of the applications is compromised, the other applications are safe, as they use a different Policy-Session-Key for their security.

The described embodiments (which may be referred to as "Cryptographic Micro-Segmentation") facilitate granular security for enterprises to secure their data while decoupled from the infrastructure. The described embodiments provide a security overlay, by using encryption, that is agnostic to the network infrastructure. The described embodiments support compartmentalized mitigation of threats or security breaches rather than requiring a complete shutdown of communications.

Existing communication security systems can either do Micro-Segmentation (also known as Access Control List Policies or ACL), or device-to-device encryption, but not both. The described embodiments provide both functions in a single solution.

The described embodiments may also derive the existing IKEv2 key rotation functions to ensure that keys can be changed periodically between the network devices. Additionally, key rotation per policy may also be performed by a central management system.

In one aspect, the invention may be a method of establishing one or more secure data channels between network devices, comprising generating and exchanging a base key pair between a first network device and a second network device, and for each of a plurality of policies, providing a nonce corresponding to that policy to the first network device and the second network device. The method may further comprise, at the first network device and the second network device, generating, for each of the plurality of policies, a session key that is a function of the base key pair and the nonce corresponding to that policy. The method may further comprise, at the first network device, (i) determining that a first data packet matches a rule associated with a first policy of the plurality of policies, (ii) encrypting the data with a first session key that corresponds to the first policy to produce a first encrypted data packet, and (iii) conveying the first encrypted data packet to the second network device. The method may further comprise, at the second network device, determining that the first encrypted data packet matches the rule associated with the first policy, and decrypting the first encrypted data packet with the first session key to produce the first data packet.

The method may further comprise, at the first network device, (i) determining that a second data packet matches a rule associated with a second policy, (ii) encrypting the second data packet with a second session key that corresponds to the second policy to produce second encrypted data, and (iii) conveying the second encrypted data packet to the second network device. The method may further comprise, at the second network device, determining that the second encrypted data packet matches the rule associated with the second policy, and decrypting the second encrypted data packet with the second session key to produce the second data packet.

In an embodiment, generating and exchanging the base key pair between the first network device and the second network device may be accomplished according to IKEv2. The nonce may be a nonce pair, with a first element of the nonce pair is associated with transmission of data from the first network device to the second network device, and a second element of the nonce pair may be associated with transmission of data from the second network device to the first network device.

The session key associated with a policy may be generated using a key derivation function (KDF) operating on the base key pair and the nonce corresponding to that policy. A management system, in communication with the first network device and the second network device, may perform (i) configuring the first network device and the second network device to enable generating and exchanging the base key pair, (ii) generating the nonce corresponding to each of the plurality of policies, and (iii) distributing each of the plurality of policies and the corresponding nonces to the first network device and the second network device.

In an embodiment, determining that a first data packet matches a rule associated with a first policy may further comprise searching a lookup table of packet match rules of the first policy and determining that a rule match exists when an entry is found in the lookup table that corresponds to the first data packet. A central management system may generate the nonce and communicate the nonce to each of the first network device and the second network device.

In another aspect, the invention may be a method of establishing one or more secure data channels between network devices, comprising generating and exchanging, by a first network device, a base key pair with a second network device. The method may further comprise, for each of a plurality of policies, receiving, by the first network device, a nonce corresponding to that policy to from a central management system. For each of the plurality of policies, the method may further comprise generating, by the first network device, a session key that is a function of the base key pair and the nonce corresponding to that policy. The method may further comprise, by the first network device, (i) determining that a first data packet matches a rule associated with a first policy of the plurality of policies, (ii) encrypting the data with a first session key that corresponds to the first policy to produce a first encrypted data packet, and (iii) conveying the first encrypted data packet to the second network device.

The method may further comprise, at the first network device, (i) determining that a second data packet matches a rule associated with a second policy, (ii) encrypting the second data packet with a second session key that corresponds to the second policy to produce second encrypted data, and (iii) conveying the second encrypted data packet to the second network device.

In an embodiment, generating and exchanging the base key pair between the first network device and the second network device may be accomplished according to IKEv2. The nonce may be a nonce pair, with a first element of the nonce pair being associated with transmission of data from the first network device to the second network device, and a second element of the nonce pair being associated with transmission of data from the second network device to the first network device. The session key associated with a policy may be generated using a key derivation function (KDF) operating on the base key pair and the nonce corresponding to that policy.

In an embodiment, determining that a first data packet matches a rule associated with a first policy may further comprise searching a lookup table of packet match rules of the first policy and determining that a rule match exists when an entry is found in the lookup table that corresponds to the first data packet.

In another aspect, the invention may be a network device in a secure communication system, comprising a processor and a memory with computer code instructions stored thereon, the memory operatively coupled to the processor such that, when executed by the processor, the computer code instructions cause the network device to (i) generate a base key pair and exchange the base key pair with a second network device, (ii) for each of a plurality of policies, receive a nonce corresponding to that policy from a central management system, (iii) generate, for each of the plurality of policies, a session key that is a function of the base key pair and the nonce corresponding to that policy, (iv) determine that a first data packet matches a rule associated with a first policy of the plurality of policies, (v) encrypt the data with a first session key that corresponds to the first policy to produce a first encrypted data packet, and (iv) convey the first encrypted data packet to the second network device.

In an embodiment, the computer code instructions may further cause the network device to determine that a second data packet matches a rule associated with a second policy of the plurality of policies, encrypt the second data packet with a second session key that corresponds to the second policy to produce second encrypted data, and convey the second encrypted data packet to the second network device.

In an embodiment, to generate and exchange the base key pair between the network device and the second network device is accomplished according to IKEv2. The nonce may be a nonce pair, where a first element of the nonce pair associated with transmission of data from the network device to the second network device, and a second element of the nonce pair is associated with transmission of data from the second network device to the network device. The session key associated with a policy may be generated using a key derivation function (KDF) operating on the base key pair and the nonce corresponding to that policy. In an embodiment, to determine that a first data packet matches a rule associated with a first policy, the computer code instructions may further cause the network device to search a lookup table of packet match rules of the first policy and determine that a rule match exists when an entry is found in the lookup table that corresponds to the first data packet.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
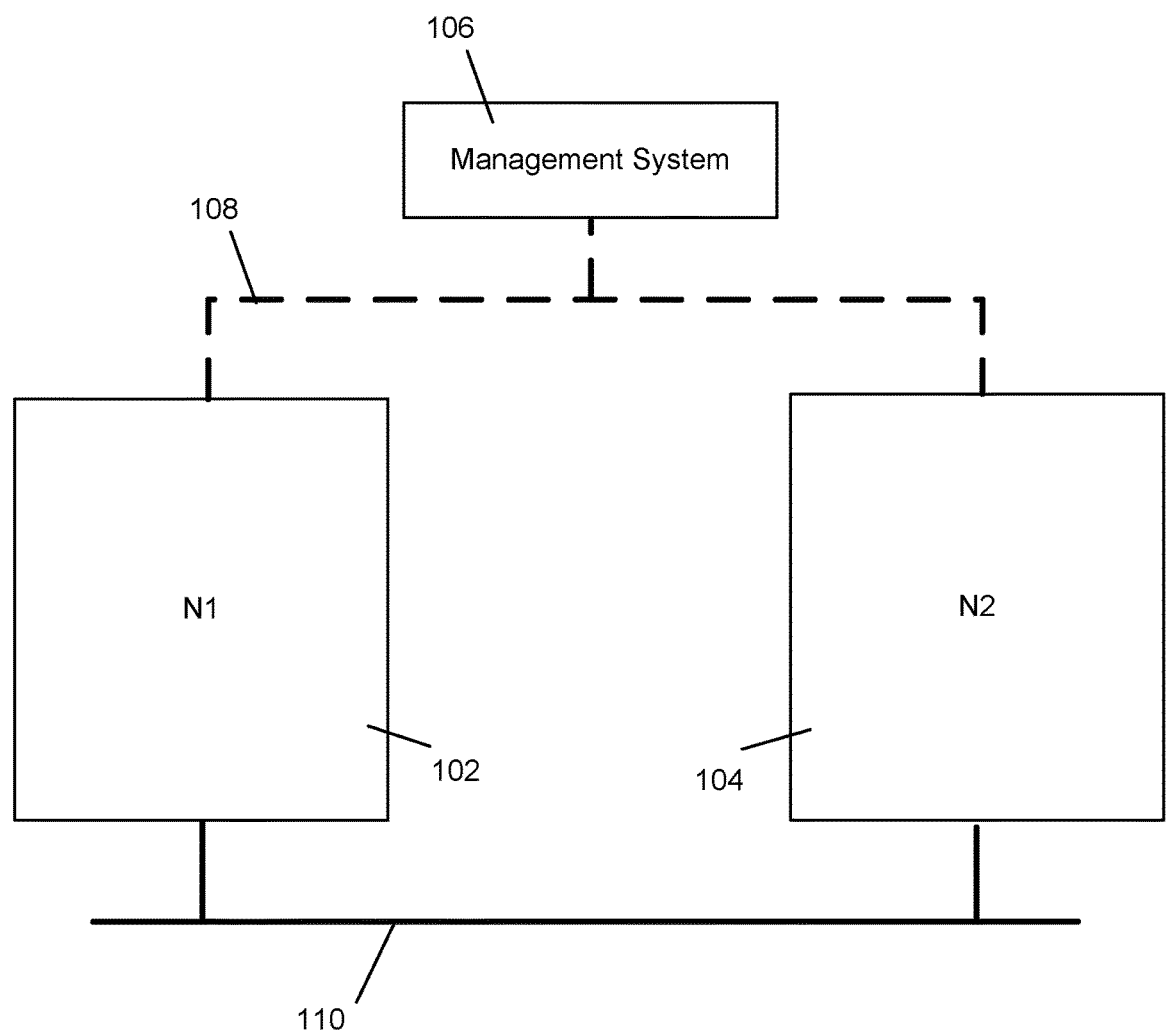
FIG. 1A shows an arrangement of components according to embodiments of the invention.

A description of example embodiments follows.

The teachings of all patents, published applications and references cited herein are incorporated by reference in their entirety.

The described embodiments implement segmentation of data traffic between network entities via cryptographic operation, and IKEv2 to exchange key pairs between a pair of network entities (communication devices). Each access to an application within the network entity is associated with a unique cryptographic key, rather than being associated with a single shared key between the pair of network entities.

The following definitions may apply to the embodiments described herein.

Network Device—A network device is an appliance that is present at the edge of the user network and is responsible for securing user data as it traverses the untrusted network between a pair of Network devices. The network devices are responsible for (i) exchanging cryptographic keys using IKEv2 protocol, (ii) enforcing user defined policies on network traffic, and (iii) encrypting and decrypting user network traffic based on the policies. Network devices can be hardware, virtual machines or software containers.

Internet Key Exchange v2 Protocol (IKEv2)—The IKEv2 protocol is a standards-based protocol, defined by the Internet Engineering Task Force (IETF), that may be used to exchange cryptographic keys between two network devices. IKEv2 implements a secure channel and exchanges keys in that secure channel. A key-pair, referred to herein as the IKEv2-key, is generated between a pair of network devices using IKEv2 application.

Central Management System—The central management system is a software application that is stored on and executed by a hardware computer or server device. The central management system allows users to configure the network devices in a way that will secure the network data. The central management system is responsible for (i) allowing users to define policies for securing traffic, (ii) applying the policies on the network devices, and (iii) enabling the network devices to perform IKEv2 key exchange protocol.

The central management system enables users to define policies that determine access between two network endpoint devices. Each endpoint may be an application running on a device (e.g., a web server, a database server, a network service, et al.) and/or a user device (e.g., a device such as a laptop, a mobile phone, a desktop computer, et al.). The central management system generates a unique key per policy (referred to herein as a "policy-key"), and distributes the policy-key to the two network devices associated with the policy.

The network devices operate as policy enforcement points. Using a predefined key derivation function, each network device combines the IKEv2-key and the policy-key to generate a session key for the policy (referred to herein as a policy-session-key). The policy-session-key is generated by each network device and stored on the data path lookup table of each network device. Any packet that arrives on the customer port, and is determined to match that policy, will now use the policy-session-key to encrypt the data traffic and wrap the encrypted data in an encapsulating security payload (ESP) and forward the ESP to the other network device.

In general, the described embodiments may utilize any rules known in the art for matching a packet to policy. On both clear and encrypted data, the selectors specified in a policy to match a packet can, for example, be one or more of (i) Ethernet VLAN Identifier, (ii) IPv4 source and/or destination addresses, (iii) IPv4 transport protocol type (For example, ICMP, TCP, UDP etc.), (iv) TCP or UDP source and/or destination ports, or (v) other IPv4 headers such as DSCP (Diff Serve Code point), or other such techniques known in the art.

The network device receiving the encrypted traffic on its network port will decrypt the packet using the same locally-generated Policy-Session-Key and forward the packet in the clear towards the customer port.

FIG. 1A shows an arrangement of components according to the described embodiments. The arrangement comprises a first network device N1 102, a second network device N2 104, and a management system 106. These components are capable of communicating with one another through a network infrastructure (not explicitly shown). In terms of logical channels, the management system 106 communicates control information over a logical management network 108 (shown as dashed lines) and data flows between network devices over a logical data network 110 (shown as solid lines).

Figure 1B:
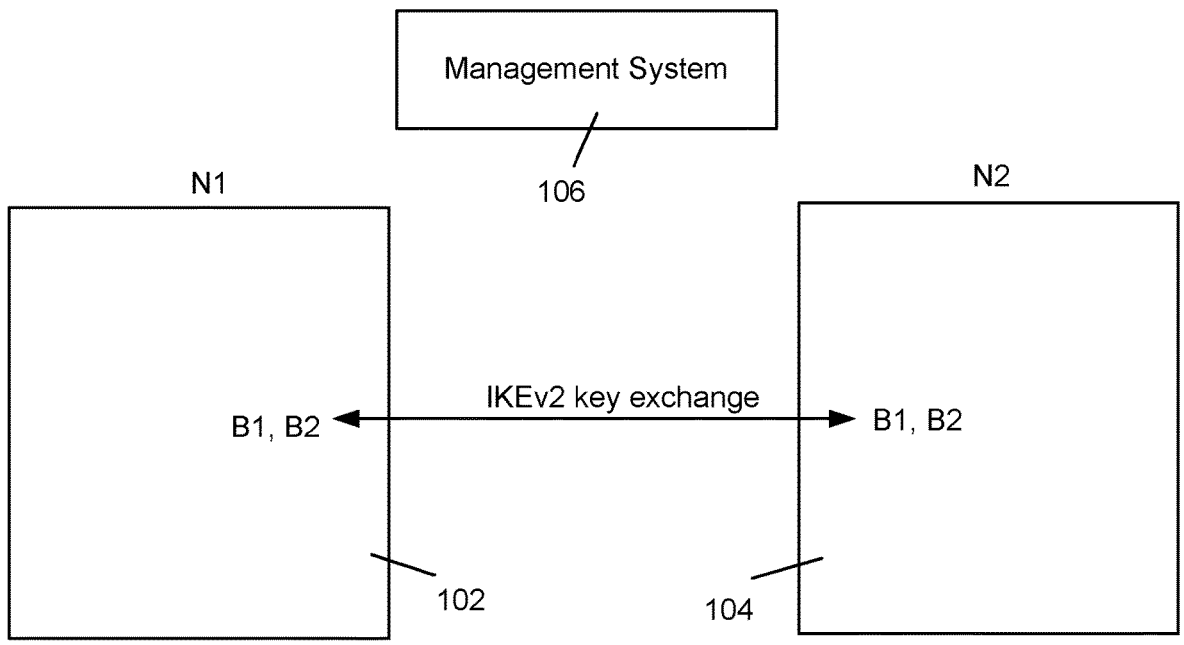
FIG. 1B illustrates an example of an IKEv2 key exchange.

In an example embodiment, a user may access the central management system 106 to define security policies and to define where such security policies are to be applied (e.g., at the network devices N1 102 and N2 104). The central management system may configure N1 102 and N2 104 to enable IKEv2 protocol and subsequently perform key exchange. FIG. 1B illustrates such a key exchange. The exchanged pair of keys is called the base key (B1, B2). Once the key exchange has been completed, each network device N1 102 and N2 104 has a copy of the base key (B1, B2).

To generate the base key (B1, B2), an IKEv2 daemon runs on the network devices N1 102 and N2 104, as is known to one skilled in the art. The network devices N1 102 and N2 104 communicate over the control channel to exchange the base keys (B1, B2). During this exchange, network device N2 104 directs network device N1 102 to use B2 for encrypting data to be transmitted to network device N2 104, and network device N1 102 directs network device N2 104 to use B1 for encrypting data to be transmitted to network device N1 102. Network device N2 104 will accept data that was encrypted using B2, and network device N1 102 will accept data that was encrypted using B1.

Figure 1C:
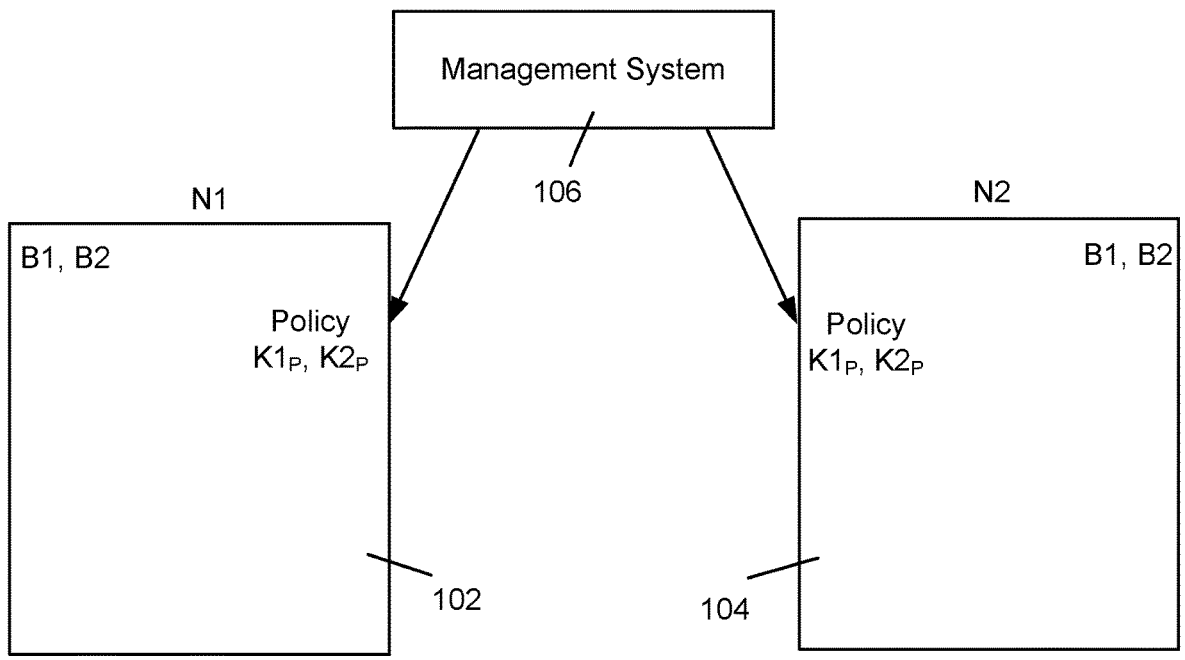
FIG. 1C illustrates the distribution, by the management system, of the policy information and the associated key nonce to the network devices.

Referring to FIG. 1C, the central management system 106 in the example embodiment generates a key nonce (K1, K2) for each user defined security policy. Each user defined security policy is thus associated with its own key nonce. In this example embodiment, only one policy and its associated key nonce is described, but it should be understood that more than one policy and associated key nonce may be generated and distributed. To generate the key nonce, the central management system 106 uses a random number generator (RNG) to generate the key nonce (K1, K2) for a user defined security policy. The central management system 106 distributes the policy and its corresponding generated key nonce (K1, K2) to the network devices N1 102 and N2 104 through a secure communication channel using a secure protocol such as, for example, Transport Layer Security (TLS). TLS is a well-known security protocol that provides privacy and data integrity for Internet communications. As with IKEv2, TLS is also a standard supported by IETF. FIG. 1C illustrates that once the management system 106 has performed nonce generation and distribution, each network device N1 102 and N2 104 has its own copy of the policy and key nonce (K1, K2)

Figures 2A, 2B:
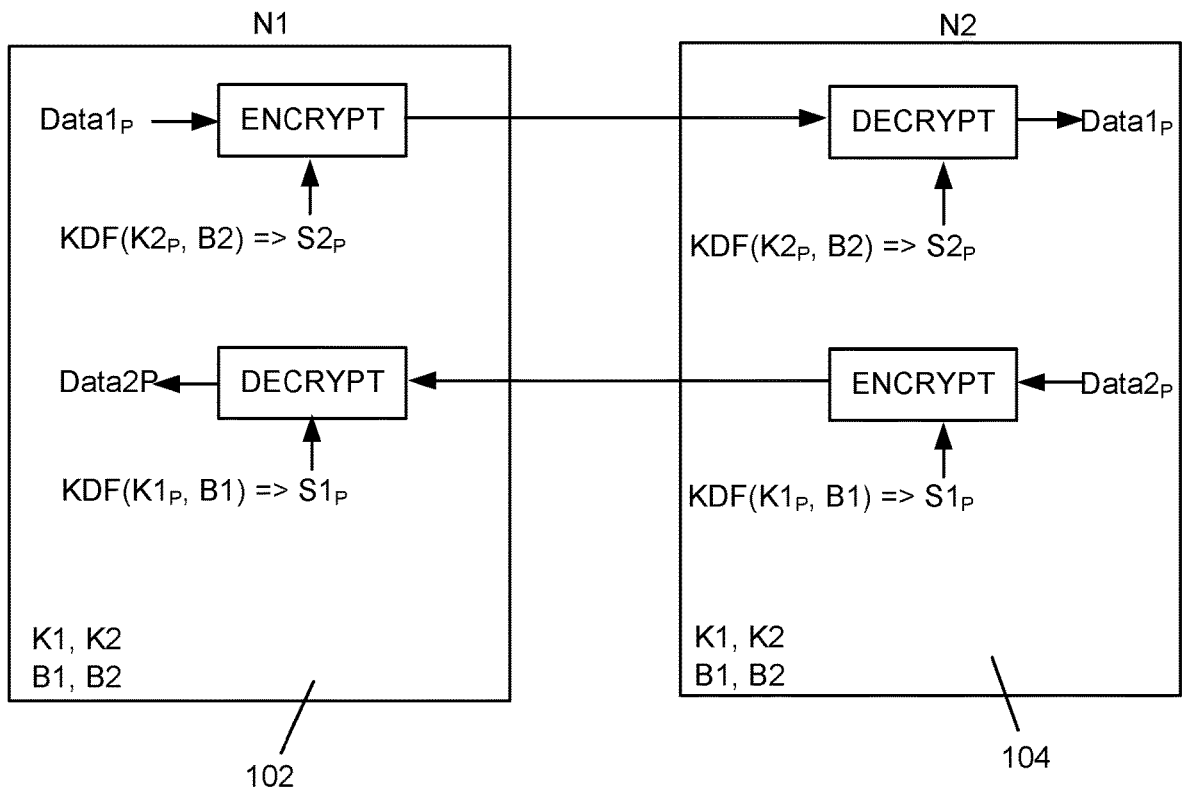
FIG. 2A illustrates the process for generating the session key according to embodiments of the invention.
FIG. 2B illustrates encryption and decryption of policy matched data according to embodiments of the invention.

Each network device N1 102 and N2 104 uses the base key (B1, B2) and the key nonce received from the central management system 106 to generate a session key (S1, S2). FIG. 2A illustrates the process for generating the session key (S1, S2). In this example, the central management system 106 generates a specific nonce (K1$_P$, K2$_P$) based on a policy P. A key derivation function (KDF[ ]) operating on the nonce (K1$_P$, K2$_P$) produces the session key (S1$_P$, S2$_P$) that is unique to policy P, i.e., $$KDF[(K1P, K2_P)] \rightarrow (S1_P, S2_P)$$

The network devices N1 102 and N2 104 use the session key (S1$_P$, S2$_P$) to encrypt and decrypt the traffic that matches the policy P. That procedure is described as below.

Referring to FIG. 2B, Data1$_P$ refers to data of policy P to be sent from N1 102 to N2 104, and Data2p refers to data of policy P to be sent from N2 104 to N1 102. As FIG. 2B shows, Data1$_P$ is encrypted at N1 102 using session key S2$_P$, and decrypted at N2 104 using session key S2$_P$. Data2$_P$ is encrypted at N2 104 using session key S1$_P$, and decrypted at N2 104 using session key S1$_P$.

To summarize, assuming a given policy P:
(I) For Data1$_P$ passing from N1 to N2, each of N1 and N2 uses K2$_P$ and B2 and the KDF to generate the session key S2$_P$, so that both N1 and N2 has the session key S2p. Data1$_P$, which is confirmed to match the policy P, is encrypted by N1 using the key S2$_P$, and N1 sends the encrypted data to N2. N2 then decrypts the policy P encrypted data using S2$_P$ to recover Data1$_P$.

(II) For Data2$_P$ passing from N2 to N1, each of N1 and N2 uses K1$_P$ and B2 and the KDF to generate the session key S1$_P$, so that both N1 and N2 has the session key S1$_P$. Data2$_P$, which is confirmed to match the policy P is encrypted by N2 using the key S1$_P$, and N2 sends the encrypted data to N1. N1 then decrypts the policy P encrypted data using S1$_P$ to recover Data2p.

Both network devices N1 102 and N2 104 will generate the same S1$_P$ and S2$_P$ independently as both are using the same Base Key, Key Nonce associated with policy P, and KDF. In some embodiments, a specific KDF may be distributed along with the key nonce, to provide an extra level of "uniqueness" to the session key. Doing so may require an intruder to ascertain three variables (i.e., KDF, key nonce, and base key) to break the micro-segmented encryption. Further, although for simplicity, the example embodiments show a common KDF being used for each session key generation, other embodiments may more than one KDF, for example a different KDF for each policy.

In an example embodiment of applying a policy P at N1 102, a packet arrives on N1 102 from the trusted network and needs to traverse the untrusted network between the network device N1 102 and network device N2 104, and so needs to be secured. Network device N1 102 evaluates the packet against a user defined policy by performing a lookup using the packet match rules. If the incoming packet matches a rule, and the rule is associated with an encrypt Session Key (e.g., S2$_P$) then N1 will encrypt the packet with the session key S2p. Network device N1 102 forwards encrypted packet on to the untrusted network towards the network device N2. Network device N2 receives the packet from the untrusted network and identifies that it is an encrypted packet. Network device N2 performs a lookup using the packet match rules. If the incoming encrypted packet matched a rule and the rule is associated with a decrypt session key (S2$_P$) then N2 decrypts the packet with the session key S2p. If decryption is determined to be successful, N2 will forward the packet on to the trusted network.

In an example embodiment of applying a policy P at N2 104, a packet arrives on N2 104 from the trusted network and needs to traverse the untrusted network between the network device N2 104 and network device N1 102, and so needs to be secured. Network device N2 104 evaluates the packet against a user defined policy by performing a lookup using the packet match rules. If the incoming packet matches a rule, and the rule is associated with an encrypt Session Key (e.g., S1$_P$) then N2 will encrypt the packet with the session key S1$_P$. Network device N2 104 forwards encrypted packet on to the untrusted network towards the network device N1. Network device N1 receives the packet from the untrusted network and identifies that it is an encrypted packet. Network device N1 performs a lookup using the packet match rules. If the incoming encrypted packet matched a rule and the rule is associated with a decrypt session key (S1$_P$) then N1 decrypts the packet with the session key S1$_P$. If decryption is determined to be successful, N1 will forward the packet on to the trusted network.

In an example embodiment, a user may define multiple policies (e.g., P1, P2, . . . PN) with different selectors (non-overlapping). The central management system 106 generates a unique key nonce for each policy. For example, key nonce for policy P1 may be (K1$_{P1}$, K2$_{P1}$), key nonce for policy P2 may be (K1$_{P2}$, K2$_{P2}$), and so on through policy PN of (K1$_{PN}$, K2$_{PN}$).

Figure 3:
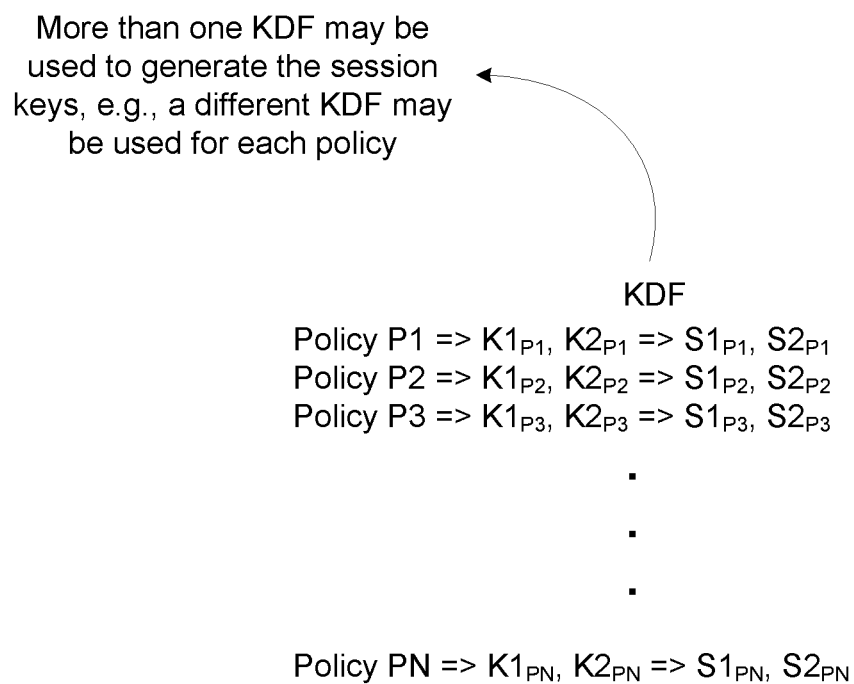
FIG. 3 illustrates the policy, key nonce, and session key generation for the N policies.

The central management system 106 then distributes the policy and associated key nonce binding for all policies (i.e., Pi, (K1$_{Pi}$, K2$_{Pi}$), for all i from 1 to N) to the network devices N1 102 and N2 104. N1 102 and N2 104 use IKEv2 to generate the base key (B1 and B2). N1 and N2 independently generate the session key for each policy by using the policy's key nonce, base key and the KDF. FIG. 3 illustrates the policy, key nonce, and session key generation for the N policies.

Figure 4:
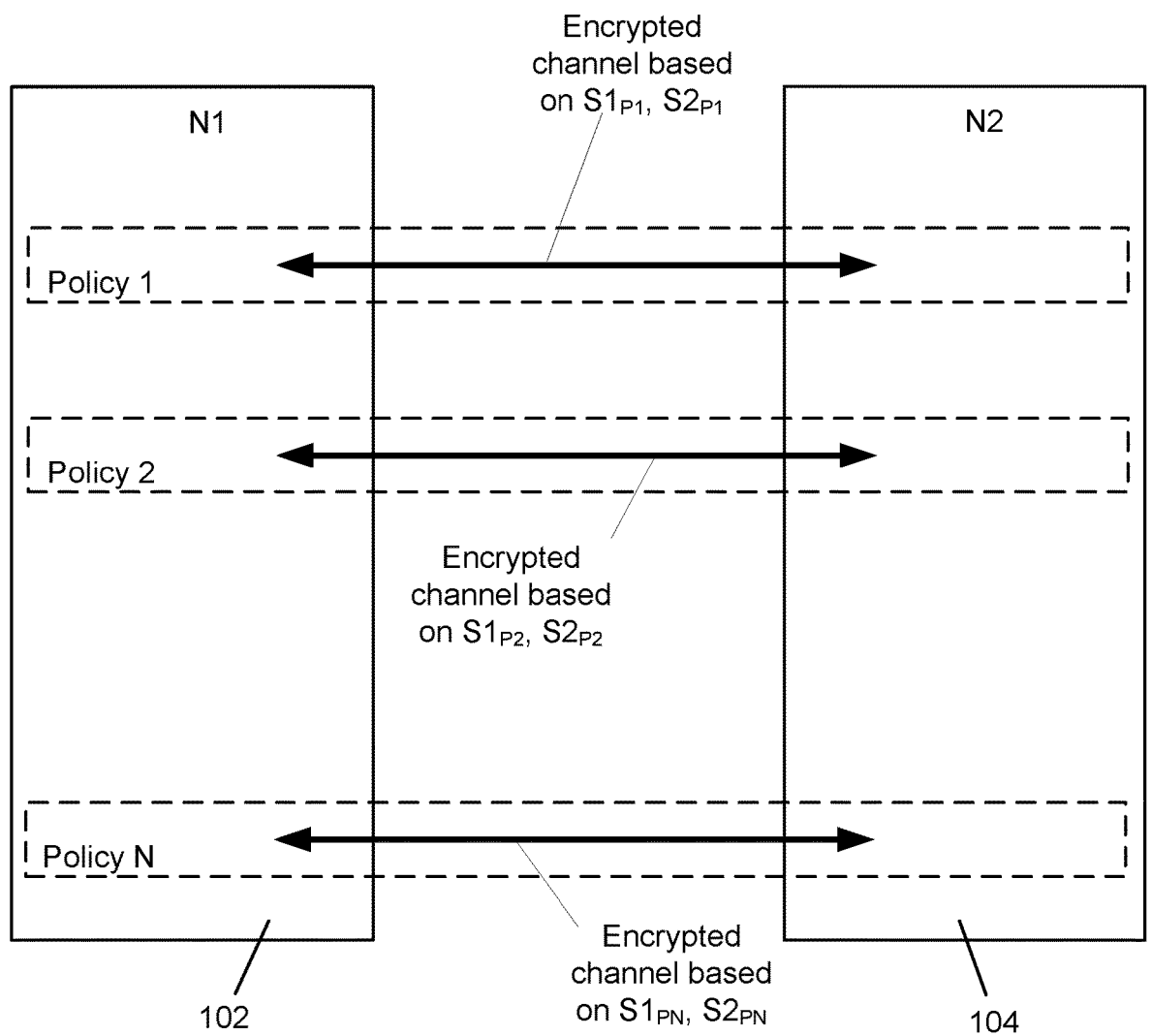
FIG. 4 illustrates the N encrypted channels between N1 and N2, based on the N policies.
Figure 5:
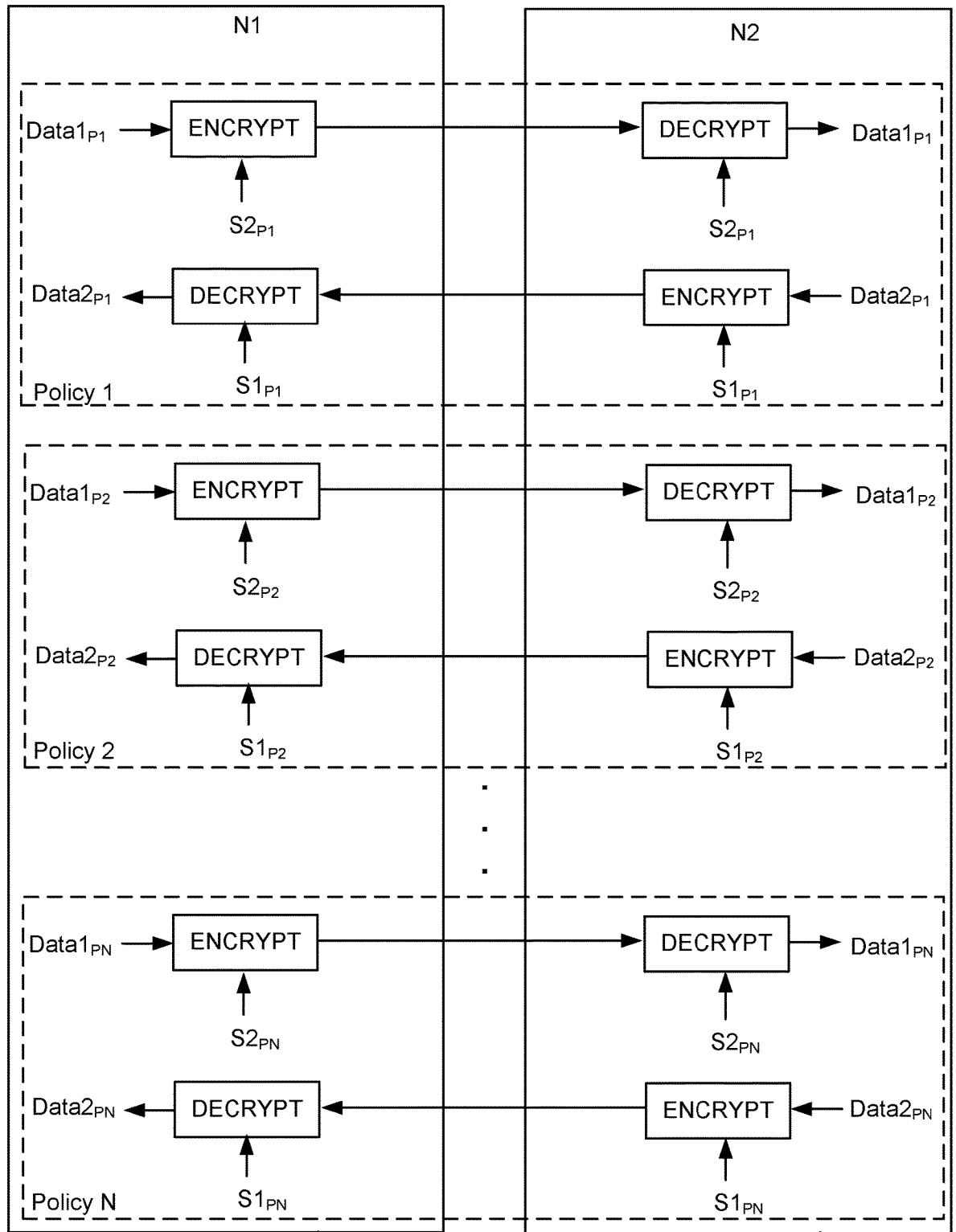
FIG. 5 shows the same N encrypted channels as shown in FIG. 4, but with specific details for each of the encrypted channels.

FIG. 4 illustrates the N encrypted channels between N1 102 and N2 104, based on the N policies. N encrypted channels are thus created between network devices N1 102 and N2 104, all based on the underlying IKEv2 base key (B1, B2), micro-segmented using the N policy-based key nonce. FIG. 5 shows the same N encrypted channels as shown in FIG. 4, but with specific details for each of the encrypted channels.

In a secure environment, it is important to rotate security keys so that they cannot be guessed by assigning sufficient compute power against encrypted data. The IKEv2 protocol uses a native mechanism to rotate keys periodically. Thus, in the described embodiments, IKEv2 will periodically rotate the values of the base key (B1, B2). When network devices N1 102 and N2 104 detect the updated value for base key (B1, B2), both devices will re-compute the session keys for all policies that according to the updated base key, and re-determine the new session keys for encrypt and decrypt functions according to the updated base key. Incoming packets that are matched to policy rules, as described herein, will the perform encrypt and decrypt functions using the new session keys.

While example embodiments have been particularly shown and described, it will be understood by those skilled in the art that various changes in form and details may be made therein without departing from the scope of the embodiments encompassed by the appended claims.

What is claimed is:

1. A method of establishing one or more secure data channels between network devices, comprising:
   generating and exchanging a base key pair between a first network device and a second network device;
   for each of a plurality of policies, providing a nonce corresponding to the each of the plurality of policies to the first network device and the second network device;
   at the first network device and the second network device, generating, for the each of the plurality of policies, a session key that is a function of the base key pair and the nonce corresponding to the each of the plurality of policies;
   at the first network device, determining that a first data packet matches a rule associated with a first policy of the plurality of policies, encrypting the data with a first session key that corresponds to the first policy to produce a first encrypted data packet, and conveying the first encrypted data packet to the second network device; and
   at the second network device, determining that the first encrypted data packet matches the rule associated with the first policy, and decrypting the first encrypted data packet with the first session key to produce the first data packet.

2. The method of claim 1, further comprising:
   at the first network device, determining that a second data packet matches a rule associated with a second policy, encrypting the second data packet with a second session key that corresponds to the second policy to produce second encrypted data, and conveying the second encrypted data packet to the second network device; and at the second network device, determining that the second encrypted data packet matches the rule associated with the second policy, and decrypting the second encrypted data packet with the second session key to produce the second data packet.

3. The method of claim 1, wherein generating and exchanging the base key pair between the first network device and the second network device is accomplished according to Internet Key Exchange, version 2 (IKEv2).

4. The method of claim 1, wherein the nonce is a nonce pair, with a first element of the nonce pair is associated with transmission of data from the first network device to the second network device, and a second element of the nonce pair is associated with transmission of data from the second network device to the first network device.

5. The method of claim 1, wherein the session key associated with a particular policy is generated using a key derivation function (KDF) operating on the base key pair and the nonce corresponding to the particular policy.

6. The method of claim 1, wherein a management system, in communication with the first network device and the second network device, performs:
configuring the first network device and the second network device to enable generating and exchanging the base key pair;
generating the nonce corresponding to each of the plurality of policies; and
distributing each of the plurality of policies and the corresponding nonces to the first network device and the second network device.

7. The method of claim 1, wherein determining that a first data packet matches a rule associated with a first policy further comprises searching a lookup table of packet match rules of the first policy and determining that a rule match exists when an entry is found in the lookup table that corresponds to the first data packet.

8. The method of claim 1, wherein a central management system generates the nonce and communicates the nonce to each of the first network device and the second network device.

9. A method of establishing one or more secure data channels between network devices, comprising:
generating and exchanging, by a first network device, a base key pair with a second network device;
for each of a plurality of policies, receiving, by the first network device, a nonce corresponding to the each of the plurality of policies to from a central management system;
for the each of the plurality of policies, generating, by the first network device, a session key that is a function of the base key pair and the nonce corresponding to the each of the plurality of policies;
by the first network device, (i) determining that a first data packet matches a rule associated with a first policy of the plurality of policies, (ii) encrypting the data with a first session key that corresponds to the first policy of the plurality of policies to produce a first encrypted data packet, and (iii) conveying the first encrypted data packet to the second network device.

10. The method of claim 9, further comprising:
at the first network device, determining that a second data packet matches a rule associated with a second policy, encrypting the second data packet with a second session key that corresponds to the second policy to produce second encrypted data, and conveying the second encrypted data packet to the second network device.

11. The method of claim 9, wherein generating and exchanging the base key pair between the first network device and the second network device is accomplished according to Internet Key Exchange, version 2 (IKEv2).

12. The method of claim 9, wherein the nonce is a nonce pair, with a first element of the nonce pair being associated with transmission of data from the first network device to the second network device, and a second element of the nonce pair being associated with transmission of data from the second network device to the first network device.

13. The method of claim 9, wherein the session key associated with a particular policy is generated using a key derivation function (KDF) operating on the base key pair and the nonce corresponding to the particular policy.

14. The method of claim 9, wherein determining that a first data packet matches a rule associated with a first policy further comprises searching a lookup table of packet match rules of the first policy and determining that a rule match exists when an entry is found in the lookup table that corresponds to the first data packet.

15. A network device in a secure communication system, comprising:
a processor; and
a memory with computer code instructions stored thereon, the memory operatively coupled to the processor such that, when executed by the processor, the computer code instructions cause the network device to:
generate a base key pair and exchange the base key pair with a second network device;
for each of a plurality of policies, receive a nonce corresponding to the each of the plurality of policies from a central management system;
generate, for the each of the plurality of policies, a session key that is a function of the base key pair and the nonce corresponding to the each of the plurality of policies;
determine that a first data packet matches a rule associated with a first policy of the plurality of policies;
encrypt the data with a first session key that corresponds to the first policy to produce a first encrypted data packet; and
convey the first encrypted data packet to the second network device.

16. The network device of claim 15, wherein the computer code instructions further cause the network device to:
determine that a second data packet matches a rule associated with a second policy of the plurality of policies;
encrypt the second data packet with a second session key that corresponds to the second policy to produce second encrypted data; and
convey the second encrypted data packet to the second network device.

17. The network device of claim 15, wherein to generate and exchange the base key pair between the network device and the second network device is accomplished according to Internet Key Exchange, version 2 (IKEv2).

18. The network device of claim 15, wherein the nonce is a nonce pair, with a first element of the nonce pair being associated with transmission of data from the network device to the second network device, and a second element of the nonce pair being associated with transmission of data from the second network device to the network device.

19. The network device of claim 15, wherein the session key associated with a particular policy is generated using a key derivation function (KDF) operating on the base key pair and the nonce corresponding to the particular policy.

20. The network device of claim 15, wherein to determine that a first data packet matches a rule associated with a first policy, the computer code instructions further cause the network device to search a lookup table of packet match rules of the first policy and determine that a rule match exists when an entry is found in the lookup table that corresponds to the first data packet.

* * * * *